US009779896B2

(12) United States Patent
Jung et al.

(10) Patent No.: US 9,779,896 B2
(45) Date of Patent: Oct. 3, 2017

(54) SIGNAL INPUT MODULE AND MOBILE TERMINAL HAVING THE SAME

(71) Applicant: LG ELECTRONICS INC., Seoul (KR)

(72) Inventors: Yuntaek Jung, Seoul (KR); Youngin Kwon, Seoul (KR); Hanseok Chae, Seoul (KR); Minho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 14/247,700

(22) Filed: Apr. 8, 2014

(65) Prior Publication Data

US 2015/0008114 A1 Jan. 8, 2015

(30) Foreign Application Priority Data

Jul. 3, 2013 (KR) ........................ 10-2013-0077887

(51) Int. Cl.
*H04M 1/00* (2006.01)
*H01H 13/83* (2006.01)

(52) U.S. Cl.
CPC ....... *H01H 13/83* (2013.01); *H01H 2219/062* (2013.01); *H01H 2235/018* (2013.01); *H01H 2235/028* (2013.01)

(58) Field of Classification Search
CPC ............. H01H 13/83; H01H 2219/062; H01H 2235/18; H01H 2235/028
USPC ........................................... 455/550.1, 575.8
See application file for complete search history.

(56) References Cited

U.S. PATENT DOCUMENTS

| | | | | | |
|---|---|---|---|---|---|
| 2007/0046636 | A1* | 3/2007 | Nam | H04M 1/23 | 345/169 |
| 2007/0235294 | A1* | 10/2007 | Kang | G06F 3/0362 | 200/4 |
| 2007/0285947 | A1* | 12/2007 | Kim | H04M 1/22 | 362/631 |
| 2008/0132284 | A1* | 6/2008 | Ryu | H04M 1/0237 | 455/566 |
| 2008/0170381 | A1* | 7/2008 | Chou | G02B 6/0021 | 362/23.03 |

* cited by examiner

*Primary Examiner* — Yuwen Pan
*Assistant Examiner* — Fatuma Sherif
(74) *Attorney, Agent, or Firm* — Dentons US LLP

(57) ABSTRACT

A signal input module includes: a key body; a key base coupled to a lower portion of the key body, and having fixing portions of different heights at both sides thereof; a flexible printed circuit board disposed such that an upper surface thereof is covered by the key base, and having a dome portion on a rear surface thereof, the dome portion configured to generate a signal when pressed by the key base; and a light emitting portion formed on one surface of the flexible printed circuit board, wherein the fixing portion and the key base are connected to each other by a connection portion, wherein the connection portion is bent from one end of the key base, extends toward the fixing portion, wherein the connection portion is provided with a hole, and wherein the flexible printed circuit board is disposed to cross the hole. Under such configuration, the number of components can be reduced and the signal input module can have a slim configuration.

9 Claims, 7 Drawing Sheets

SIGNAL INPUT MODULE AND MOBILE TERMINAL HAVING THE SAME

CROSS-REFERENCE TO RELATED APPLICATION

Pursuant to 35 U.S.C. §119(a), this application claims the benefit of earlier filing date and right of priority to Korean Application No. 10-2013-0077887, filed on Jul. 3, 2013, the contents of which is incorporated by reference herein in its entirety.

BACKGROUND OF THE DISCLOSURE

1. Field of the Disclosure

The present disclosure relates to a mobile terminal, and particularly, to a signal input module capable of generating a signal by a user's manipulation, and a mobile terminal having the same.

2. Background of the Disclosure

As a mobile terminal becomes multifunctional, the mobile terminal can be allowed to capture still images or moving images, play music or video files, play games, receive broadcast, etc., so as to be implemented as an integrated multimedia player.

Terminals can be divided into mobile/portable terminals and stationary terminals according to their mobility. The mobile terminal is a portable device that can be carried anywhere and have one or more of a function of performing voice and video calls, a function of inputting/outputting information, a function of storing data, etc.

In order to support and enhance such functions of the terminal, it can be considered to improve the configuration and/or software of the terminal.

The mobile terminal is provided with a signal input unit, such as a home key, side keys or volume keys, at one side of a case. A user executes one or more functions of the mobile terminal by manipulating the signal input unit.

Such signal input unit is formed as a plurality of components are assembled to each other. As the number of components is increased, assembly processes may become complicated and it may take a lot of assembly time. Further, the signal input unit having a prescribed volume may cause the mobile terminal not to have a slim structure. Accordingly, a signal input unit, capable of having a small size and simplifying assembly processes, may be considered.

SUMMARY OF THE DISCLOSURE

Therefore, an aspect of the detailed description is to provide a mobile terminal provided with a signal input module having a differentiated structure from the conventional structure.

Another aspect of the detailed description is to provide a mobile terminal having an enhanced connection structure, and having a minimized signal input module.

To achieve these and other advantages and in accordance with the purpose of this specification, as embodied and broadly described herein, there is provided a signal input module, including: a key body; a key base coupled to a lower portion of the key body, and having fixing portions of different heights at both sides thereof; a flexible printed circuit board disposed such that an upper surface thereof is covered by the key base, and having a dome portion on a rear surface thereof, the dome portion configured to generate a signal when pressed by the key base; and a light emitting portion formed on one surface of the flexible printed circuit board, wherein the fixing portion and the key base are connected to each other by a connection portion, wherein the connection portion is bent from one end of the key base, extends toward the fixing portion, wherein the connection portion is provided with a hole, and wherein the flexible printed circuit board is disposed to cross the hole.

According to one embodiment of the present invention, the key base may include: an elastic plate formed such that a rear surface thereof contacts the flexible printed circuit board; and a light guiding portion laminated on the elastic plate, and configured to receive light generated from the light emitting portion.

According to one embodiment of the present invention, the light emitting portion may be disposed at one side of the light guiding portion.

According to one embodiment of the present invention, the elastic plate and the light guiding portion may be integrally formed with each other by double injection.

To achieve these and other advantages and in accordance with the purpose of this specification, as embodied and broadly described herein, there is also provided a mobile terminal, including: a case having a through hole; and a signal input module coupled to the case such that part thereof is exposed to outside via the through hole, wherein the signal input module includes: a key body; a key base coupled to a lower portion of the key body, and having fixing portions of different heights at both sides thereof; a flexible printed circuit board disposed such that an upper surface thereof is covered by the key base, and having a dome portion on a rear surface thereof, the dome portion configured to generate a signal when pressed by the key base; and a light emitting portion formed on one surface of the flexible printed circuit board, wherein the fixing portion and the key base are connected to each other by a connection portion, wherein the connection portion is bent from one end of the key base, extends toward the fixing portion, wherein the connection portion is provided with a hole, and wherein the flexible printed circuit board is disposed to cross the hole.

According to one embodiment of the present invention, the mobile terminal may further include a supporting portion formed in the case and configured to support the signal input module, wherein the dome portion is disposed to contact the supporting portion.

According to one embodiment of the present invention, an actuator may protrude from a central part of the dome portion, so as to contact the supporting portion.

According to one embodiment of the present invention, the key base may include: an elastic plate formed such that a rear surface thereof contacts the flexible printed circuit board; and a light guiding portion laminated on the elastic plate, and configured to receive light generated from the light emitting portion.

According to one embodiment of the present invention, the light emitting portion may be disposed at one side of the light guiding portion.

According to one embodiment of the present invention, the elastic plate and the light guiding portion may be integrally formed with each other by double injection.

According to one embodiment of the present invention, the connection portion or the fixing portion may further include a separation member configured to separate the flexible printed circuit board from the supporting portion.

According to one embodiment of the present invention, the light guiding portion may further include a printed layer formed such that light introduced from the light emitting portion has a specific color.

According to one embodiment of the present invention, the light guiding portion may be formed of at least one of PET (Polyethylene Terephthalate) and TPU (Thermo Plastic Polyurethane).

According to one embodiment of the present invention, the elastic plate may be formed of at least one of rubber, silicone, polyurethane, and thermoplastic polyurethane.

The present invention may have the following advantages.

Firstly, as the key body, the key base and the flexible printed circuit board form the signal input module in an integral manner, assembly processes of the mobile terminal can be simplified.

Secondly, as the key base is utilized as the light guiding portion, the number of components can be reduced and the signal input module can have a slim configuration.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, a mobile terminal of the present disclosure will be explained in more detail with reference to the attached drawings. The suffixes "module" and "unit or portion" for components used in the following description merely provided only for facilitation of preparing this specification, and thus they are not granted a specific meaning or function. In addition, when it is determined that a detailed description of a technology known in the related art prevents the nature and gist of the present invention from being made apparent, the detailed description of the technology is omitted. In addition, the accompanying drawings are only for helping get an easy understanding of the idea of the present invention and notably, should not be construed as imposing any limitation on the idea of the invention.

The mobile terminal according to the present invention may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
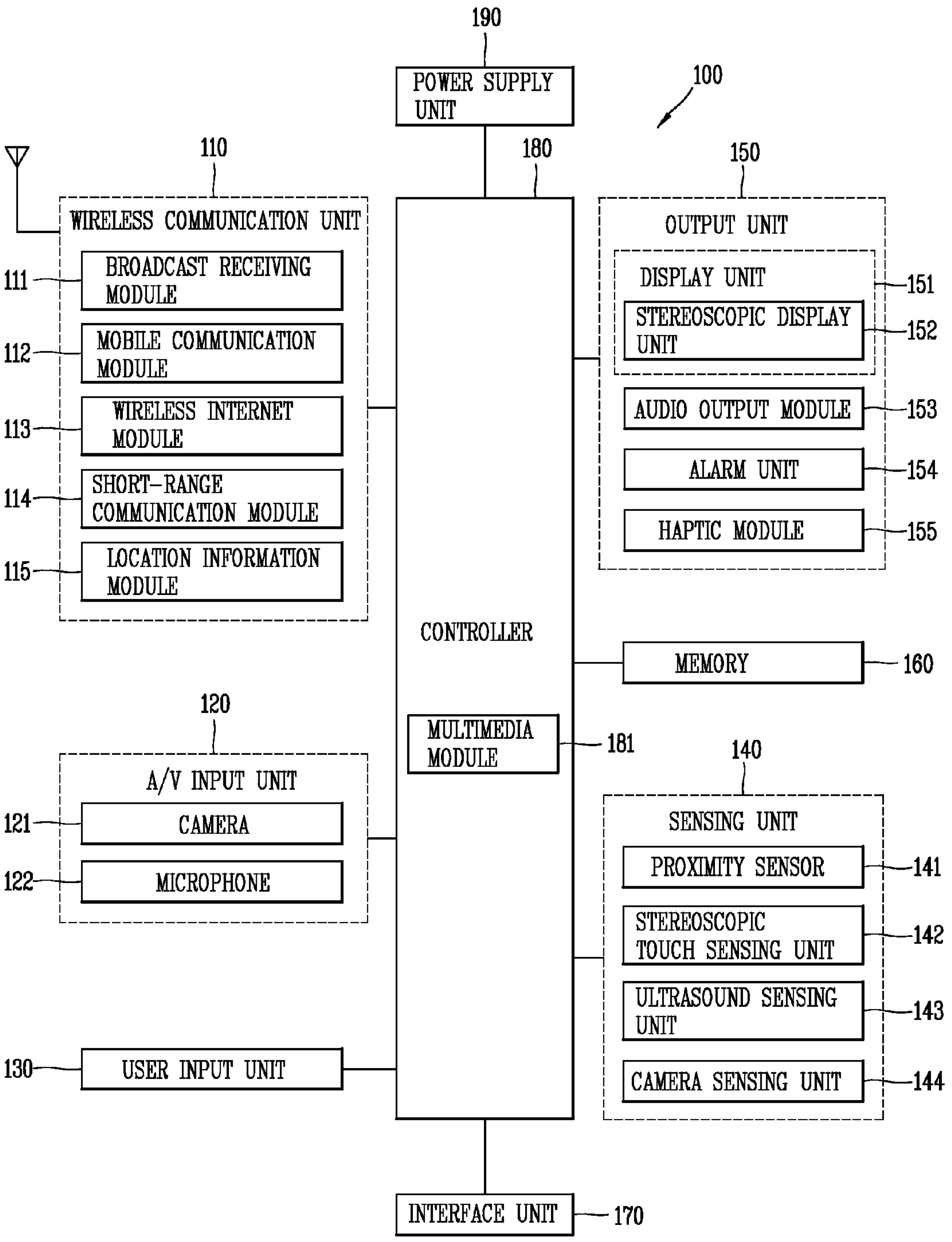
FIG. 1 is a block diagram of a mobile terminal according to an embodiment of the present invention.

FIG. 1 is a block diagram of a mobile terminal according to an embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner. The output unit 150 may include the display unit 151, an audio output module 153, an alarm unit 154, a haptic module 155, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

If the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into the proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2:
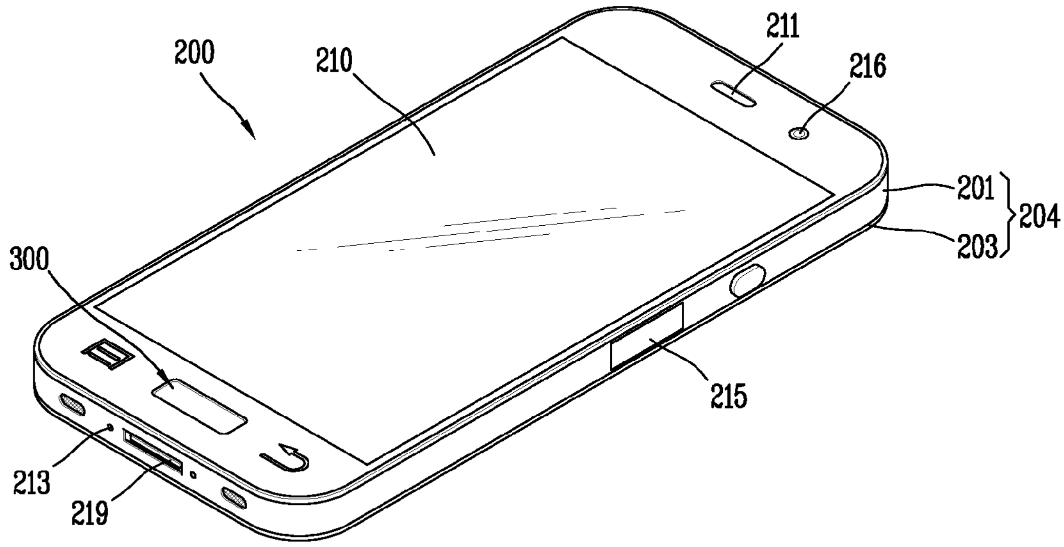
FIG. 2 is a front perspective view of a mobile terminal according to an embodiment of the present invention.
Figure 3:
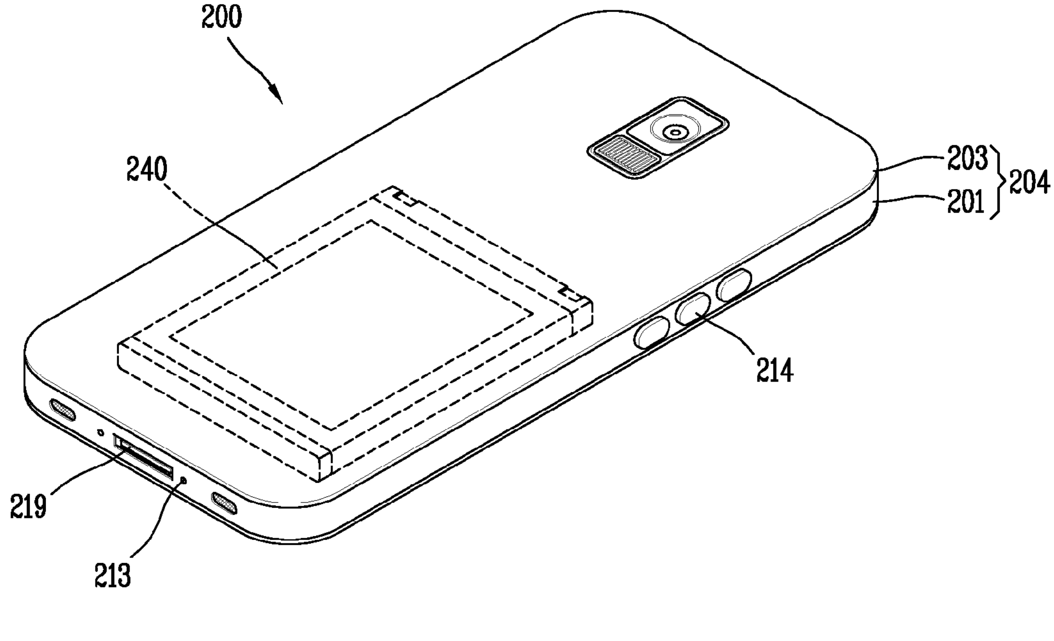
FIG. 3 is a rear perspective view of the mobile terminal of FIG. 2.

FIG. 2 is a front perspective view of a mobile terminal according to the present invention, and FIG. 3 is a rear perspective view of the mobile terminal of FIG. 2.

Referring to FIGS. 2 and 3, the mobile terminal 200 according to the present invention is provided with a bar type terminal body 204. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof.

A case (casing, housing, cover, etc.) which forms the appearance of the terminal body 204 may include a front case 201, a rear case 202, and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display unit 210, a first audio output unit 211, a front camera 216, a side key 214, an interface unit 215, and a signal input unit 300.

The display unit 210 includes a liquid crystal display (LCD) module, organic light emitting diodes (OLED) module, e-paper, etc., each for visually displaying information. The display unit 210 may include a touch sensing means for inputting information in a touch manner. Hereinafter, the display unit 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display unit 210.

The image frames processed by the front camera 216 may be stored in the memory 160, or may be transmitted to the outside through the wireless communication unit 110. The front camera 216 may be implemented in two or more according to a user's interface.

The user input unit 300 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 300 may be implemented as a dome switch, or a touch screen, or a touch pad for inputting commands or information in a user's push or touch manner. Alternatively, the user input unit 300 may be implemented, for example, as a wheel for rotating a key, a jog, or a joystick. The user input unit 300 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 221, controlling the level of sound output from the audio output unit 211, and converting a current mode of the display unit 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the body 204.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204.

Figure 4:
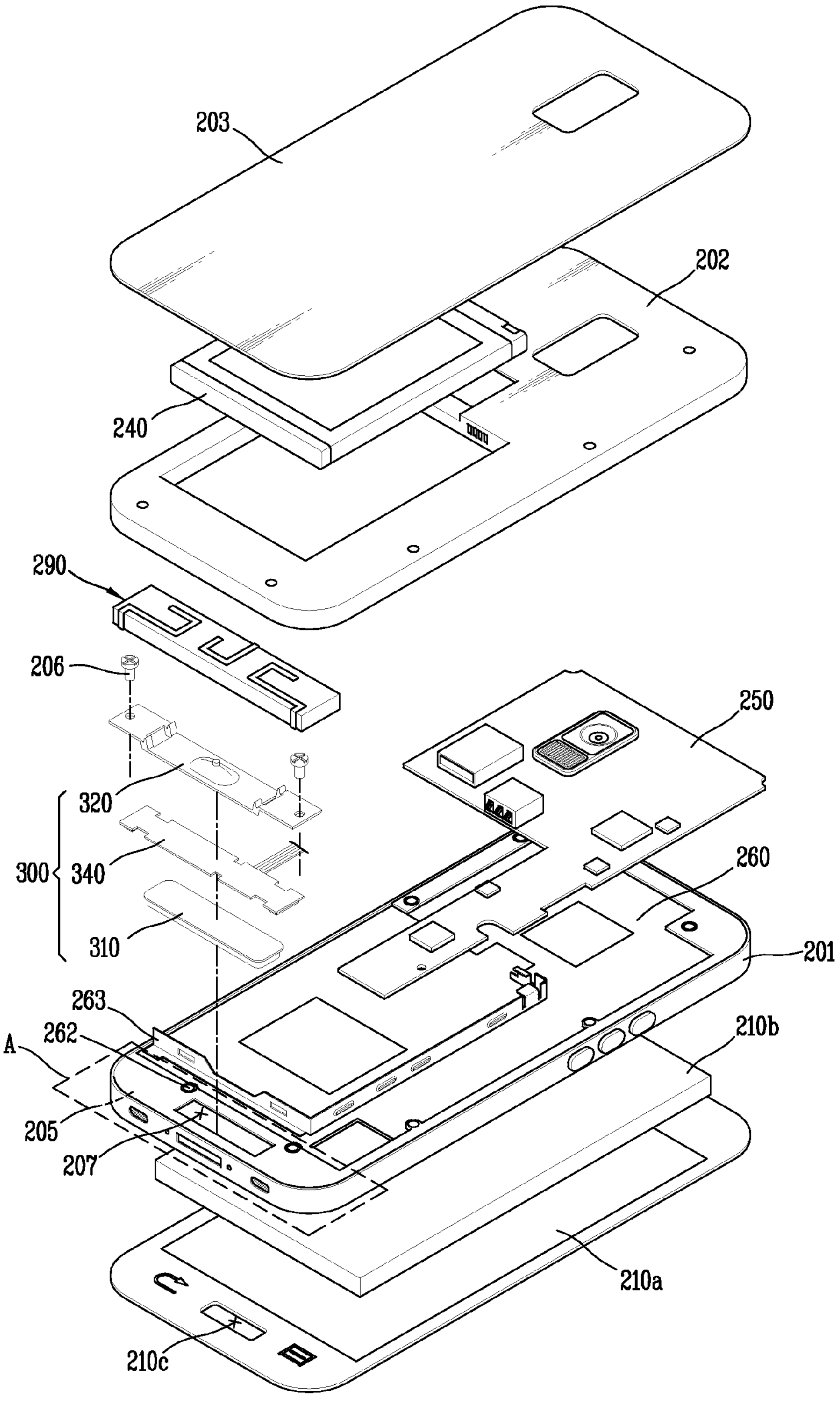
FIG. 4 is an exploded perspective view of FIG. 3.

FIG. 4 is an exploded perspective view of FIG. 3.

Referring to FIG. 4, the mobile terminal includes a window 210*a* and a display module 210*b* which constitute the display unit 210. The window 210*a* may be coupled to one surface of the front case 201. The window 210*a* and the display module 210*b* may be integrally formed with each other.

A frame 260, configured to support electric devices, is formed between the front case 201 and the rear case 202. The frame 260, a structure to support inside of the mobile terminal, may be configured to support at least one of the display module 210*b*, the camera module 221, an antenna device, an antenna module having a plurality of antenna devices, a battery 240 and a printed circuit board 250.

The frame 260 may be configured such that part thereof is exposed to outside of the mobile terminal. Further, the frame 260 may constitute part of a sliding module which connects the terminal body and the display unit with each other, in a slide type mobile terminal, not a bar type mobile terminal.

Referring to FIG. 4, the printed circuit board 250 is disposed between the frame 260 and the rear case 202, and the display module 210*b* is coupled to one surface of the frame 260. The printed circuit board 250 and the battery 240 may be disposed on another surface of the frame 260, and a battery case 203 for covering the battery 240 may be coupled to the rear case 202.

The window 210*a* is coupled to one surface of the front case 201. A touch sensing pattern 210*c*, configured to sense a touch input, may be formed on one surface of the window 210*a*. The touch sensing pattern 210*c* is formed of a light transmissive material. The touch sensing pattern 210*c* may be mounted to a front surface of the window 210*a*, and may be configured to convert a change of a voltage occurring from a specific part of the window 210*a* into an electric input signal.

The display module 210*b* is mounted to a rear surface of the window 210*a*. In this embodiment, the display module 210*b* is implemented as a thin film transistor-liquid crystal display (TFT-LCD). However, the present invention is not limited to this.

For instance, the display module 210*b* may be implemented as a liquid crystal display (LCD), an organic light-emitting diode (OLED), a flexible display, a 3D display, etc.

As aforementioned, the printed circuit board 250 may be mounted to one surface of the frame 260. However, the printed circuit board 250 may be mounted below the display module 210*b*. At least one electronic devices are mounted onto a lower surface of the printed circuit board 250.

A battery accommodation portion, which is recessed to accommodate the battery 240 therein, is formed at the frame 260. A contact terminal connected to the printed circuit board 250 may be formed on one side surface of the battery accommodation portion, so that the battery 240 can supply power to the terminal body.

An antenna device may be formed on an upper end or a lower end of the mobile terminal. The antenna device may be formed in plurality in number, and the plurality of antenna devices may be disposed at the respective ends. The antenna devices may be configured to transmit and receive radio signals in different frequency bands. Such antenna device may include conductive members formed on one surface of a carrier. For instance, a carrier 290, where conductive members have been formed, may be mounted to part 'A' of FIG. 4. The carrier 290 may be coupled to the part 'A' of the case 201 by coupling means such as screws. In this case, the screws may be coupled to holes 262 of the case 201 through holes of the carrier 290. A rib 263 of the frame 260, which will be explained later, may define a space where the carrier 290 is mounted.

The frame 260 may be formed of a metallic material so as to have a sufficient strength even in a small thickness. The frame 260 formed of a metallic material may operate as a ground. That is, the printed circuit board 250 or the antenna device may be ground-connected to the frame 260, and the frame 260 may operate as a ground of the printed circuit board 250 or the antenna device. In this case, the frame 260 may extend a ground of the mobile terminal.

The printed circuit board 250 is electrically connected to the antenna device, and is configured to process radio signals (or radio electromagnetic waves) transmitted and received by the antenna device. For processing of radio signals, a plurality of transceiving circuits may be mounted to the printed circuit board 250.

The transceiving circuits may include one or more integrated circuits and related electric devices. As an example, the transceiving circuits may include a transmission integrated circuit, a reception integrated circuit, a switching circuit, an amplifier, etc.

As the plurality of transceiving circuits simultaneously feed conductive members formed in conductive patterns, a plurality of antenna devices may operate simultaneously. For instance, while one of the transceiving circuits performs signal transmission, another may perform signal reception. Alternatively, both of the transceiving circuits may perform signal transmission or signal reception.

Coaxial cables may be formed to connect the printed circuit board 250 with the antenna devices. For instance, the coaxial cables may be connected to feeding devices for feeding the antenna devices.

A first antenna device (ANT1) and a second antenna device (ANT2) may be formed at one side and another side of a carrier 290, respectively. The first antenna device (ANT1) and the second antenna device (ANT2) are configured to transceive (transmit and receive) signals in different frequency bands.

For instance, the first antenna device (ANT 1) may be configured to transceive DCN 1× type or PCS 1× type signals, and the second antenna device (ANT 2) may be configured to transceive DCN EVDO (Evolution-Data Optimized or Evolution-Data Only) type signals.

If the first antenna device (ANT 1) transceives LTE B4 type signals, the second antenna device (ANT 2) may transceive LTE B13 type signals.

Alternatively, if the first antenna device (ANT 1) transceives signals corresponding to voice service of the mobile terminal, the second antenna device (ANT 2) may transceive data signals corresponding to LTE service of the mobile terminal.

A signal input module 300, configured to generate a signal by a user's manipulation, may be mounted to part 'A' of FIG. 4. The signal input module 300 may be disposed between the front case 201 and the carrier 290. Once the signal input module 300 is disposed between the front case 201 and the carrier 290, the signal input module 300 may be supported by the carrier 290. In this case, the carrier 290 may be a supporting portion to be explained later.

The key body 310 of the signal input module 300 may be exposed to outside through a hole 207 of the front case 201, and the touch sensing pattern 210*c* of the window 210*a*. The signal input module 300 may be fixed to the front case 201 by screws 206.

Alternatively, the signal input module 300 may be formed on a side surface of the mobile terminal, the side surface which forms appearance of the mobile terminal. In this embodiment, the signal input module 300 is configured as a home key. However, the signal input module 300 may be configured as a side key or a volume key.

Figure 5:
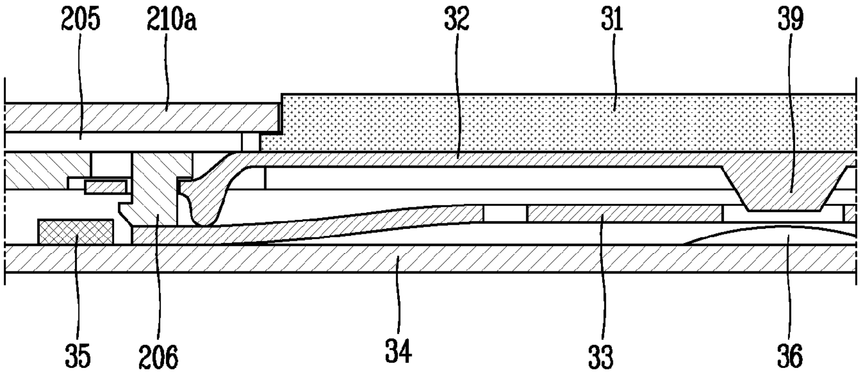
FIG. 5 is a conceptual view of a signal generator according to a comparative embodiment.
Figure 6:
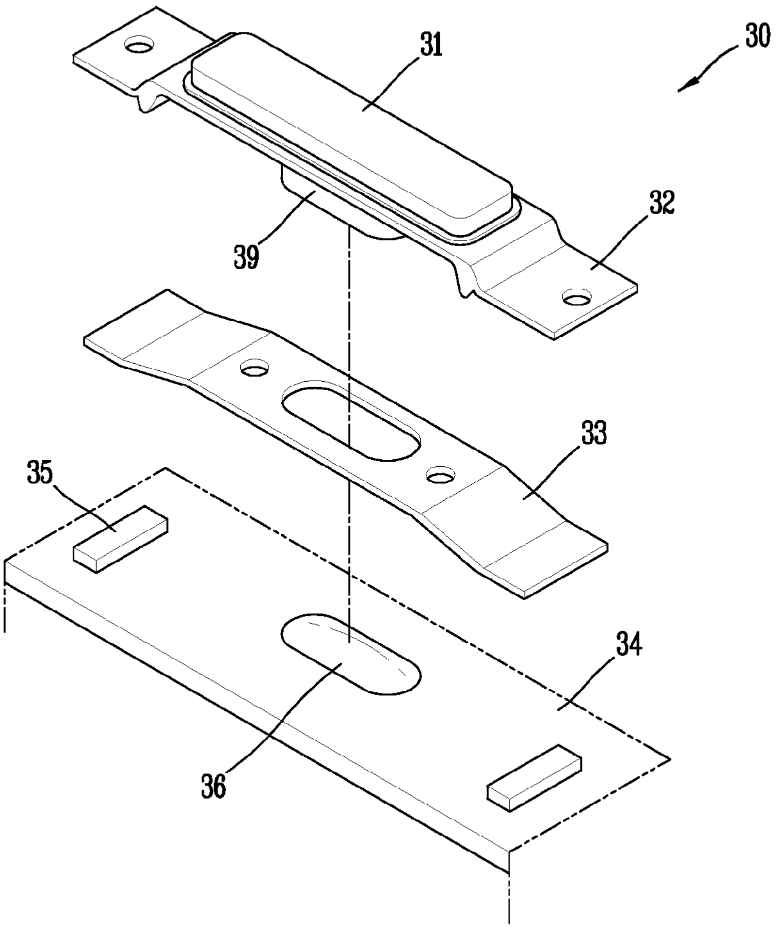
FIG. 6 is an exploded perspective view of FIG. 5.

FIG. 5 is a conceptual view of a signal generator 30 according to a comparative embodiment, and FIG. 6 is an exploded perspective view of FIG. 5.

Referring to FIGS. 5 and 6, the signal generator 30 according to a comparative embodiment includes a key body 31, a key base 32, and a flexible printed circuit board (FPCB) 34. The signal generator 30 is formed so that part thereof can be exposed to outside through the case. That is, an upper part of the key body 31 may be exposed to outside of the case. For this, the case may be provided with a hole through which an upper part of the key body 31 is exposed to outside.

An actuator 39 is formed on a lower surface of the key base 32. A dome portion 36 is formed on one surface of the FPCB 34, and actuator 39 is configured to press the dome portion 36. The actuator 39 presses the dome portion 36 disposed to face the actuator 39, by a user's pressing operation. The pressed dome portion 36 is elastically transformed by the actuator 39, and electrically-connects two contacts formed on one surface of the FPCB 34 to each other, thereby generating a signal.

The FPCB 34 is connected up to the printed circuit board mounted in the terminal body. Under such configuration, a signal generated as a user presses the key body 31 is transmitted up to the printed circuit board via the FPCB 34.

The light guiding portion 33 is disposed between the key base 32 and the FPCB 34. A light emitting portion 35 is formed at one side of the light guiding portion 33. Light generated from the light emitting portion 35 moves along the light guiding portion 33, to thus illuminate the key body 31. The light emitting portion 35 is formed at the FPCB 34, and supplies light to the light guiding portion 33.

In the comparative embodiment, the key base 32 is coupled to the case by a coupling means such as screws or an adhesive. The FPCB 34 is additionally coupled to the case. In the comparative embodiment, the key base 32 and the FPCB 34 are not integrally formed with each other as a single module. Accordingly, the key base 32 and the FPCB 34 should be assembled to the case, respectively. As the light guiding portion 33 is disposed between the key base 32 and the FPCB 34, a thickness of the signal generator 30 is increased as much as by a thickness of the light guiding portion 33.

Hereinafter, will be explained the signal input module 300 capable of reducing the number of assembly processes by integrally forming the key base 32 and the FPCB 34 of the signal generator 30 with each other, and capable of reducing a thickness thereof by effectively configuring the light guiding portion 33.

Figure 7:
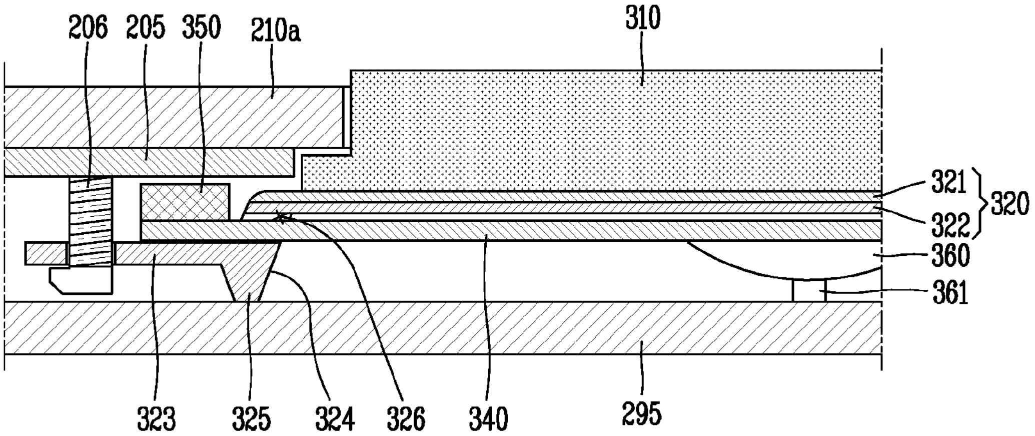
FIG. 7 is a conceptual view of a signal input module according to an embodiment of the present invention.
Figure 8:
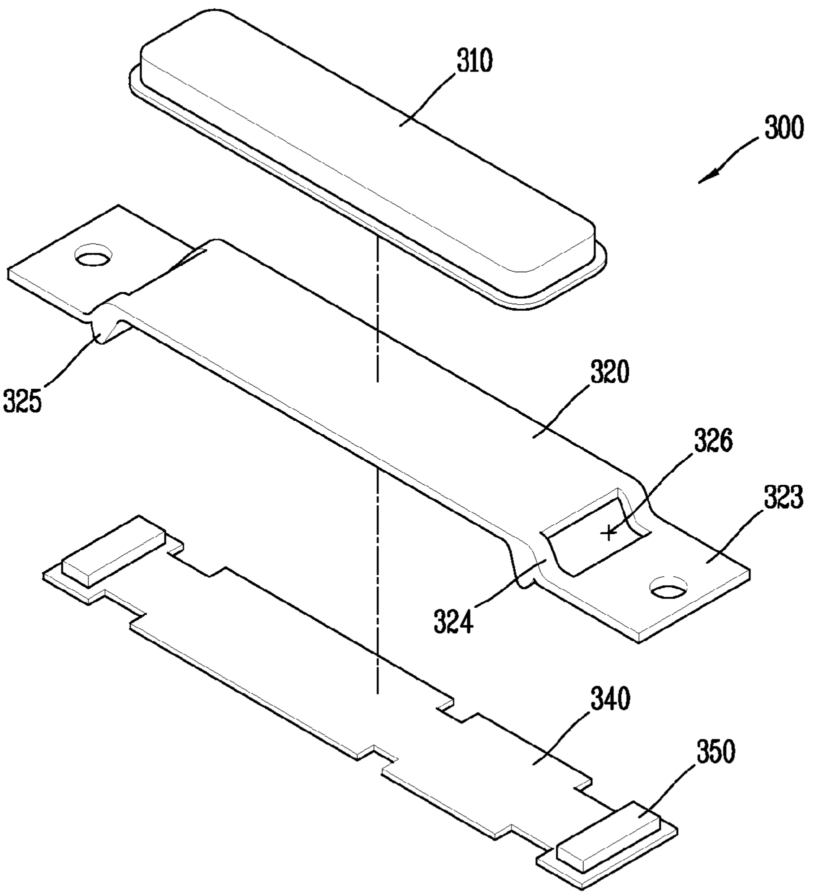
FIG. 8 is an exploded perspective view of FIG. 7.
Figure 9:
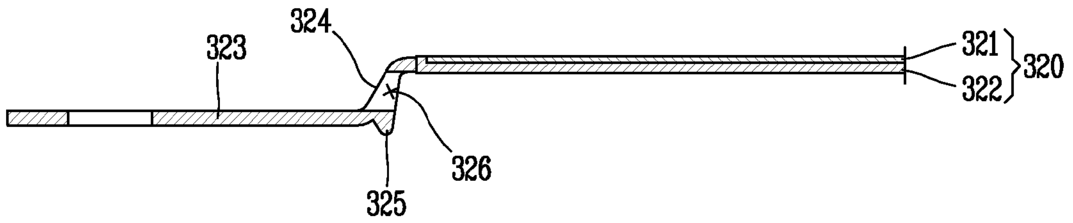
FIG. 9 is a sectional view of a key base according to an embodiment of the present invention.
Figure 10:
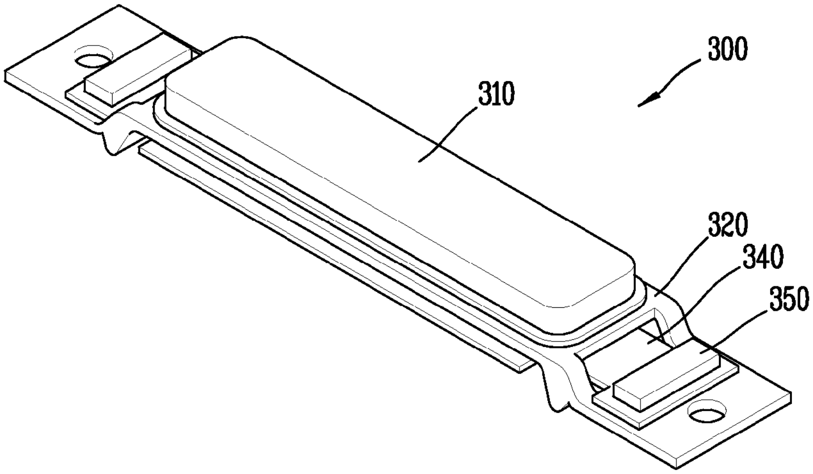
FIG. 10 is a perspective view of a signal input module according to an embodiment of the present invention.

FIG. 7 is a conceptual view of the signal input module 300 according to an embodiment of the present invention; FIG. 8 is an exploded perspective view of FIG. 7; FIG. 9 is a sectional view of the key base 320 according to an embodiment of the present invention; and FIG. 10 is a perspective view of the signal input module 300 according to an embodiment of the present invention.

Referring to FIGS. 7 and 8, the signal input module according to an embodiment of the present invention may include the key body 310, the key base 320 and the FPCB 340. Part of the signal input module 300 may be exposed to outside through the case.

The case 205 may be a front case, a rear case each forming appearance of the mobile terminal, an intermediate case, or a battery case.

Under such configuration, an upper part of the key body 310 may be exposed to outside of the case. For this, the case may be provided with a hole through which an upper part of the key body 310 is exposed to outside.

The key body 310 may be formed of at least one of PC (polycarbonate), PMMA (Polymethyl methacrylate) and STS (Stainless Steel). The key body 310 may be formed such that at least part thereof is transparent. The key body 310 may be formed of a transmissive material so as to emit light when supplied with light. A light leakage portion may be formed between the key body 310 and the hole of the case such that light leaks out therethrough. The light leakage portion may be formed of a transmissive material.

The key body 310 may be coupled to the key base 320 by an adhesive or a double-sided tape. A key mark indicating a key type may be formed on one surface of the key body 310.

Referring to FIG. 10, the key base 320 may include an elastic plate 322 and a light guiding portion 321. A rear surface of the elastic plate 322 may come in contact with the FPCB 340. The elastic plate 322 may be formed of rubber, silicone, polyurethane, thermoplastic polyurethane, etc.

The elastic plate 322 may be elastically transformed by a user's pressing operation.

The light guiding portion 321 may be configured to illuminate the key body 310, by receiving light from a light emitting portion 350 disposed at one side of the light guiding portion 321. The light guiding portion 321 may be formed of at least one PET (Polyethylene Terephthalate) and TPU (Thermo Plastic Polyurethane). The light guiding portion 321 may include a printed layer formed such that light introduced from the light emitting portion 350 has a specific color.

The elastic plate 322 and the light guiding portion 321 may be integrally formed with each other by double injection. Such double injection indicates a method for arranging a firstly-molded object in a metallic pattern, and then filling a resin in a secondary cavity formed between the firstly-molded object and the metallic pattern. For instance, one of the elastic plate 322 and the light guiding portion 321 is firstly-molded to thus be arranged in a metallic pattern. Then resin is filled into a cavity formed between the firstly-molded one and the metallic pattern, thereby integrally forming the firstly-molded one with the key base 320.

Referring to FIGS. 8 and 9, fixing portions 323 may be formed at two sides of the key base 320. The signal input module 300 may be coupled to the case through the fixing portions 323. The signal input module 300 may be coupled to the case by a coupling means such as screws or an adhesive.

The fixing portion 323 and the key base 320 may be formed to have different heights. As the fixing portion 323 and the key base 320 are formed to have different heights, the FPCB 340 may be arranged between the fixing portions 323 and the key base 320. That is, in a case where the fixing portions 323 are arranged at a first height and the key base 320 is arranged at a second height, the FPCB 340 may be formed at a third height between the first height and the second height.

A connection portion 324 may be formed to connect the fixing portion 323 and the key base 320 having different heights, with each other. The connection portion 324 may be bent from one end of the key base 320 or the fixing portion 323, so as to extend toward the fixing portion 323 or the key base 320.

Referring to FIGS. 7 and 8 back, a hole 326 may be formed at the connection portion 324. The FPCB 340 may be disposed to cross the hole 326.

The FPCB 340 may be disposed such that one surface thereof is covered by the key base 320, and may have a dome portion 360 on a rear surface thereof. The dome portion 360 may be disposed so as to contact a supporting portion 295 to be explained later. An actuator 361 may be formed at a central part of the dome portion 360. The actuator 361 may protrude from the dome portion 360. The actuator 361 may be integrally formed with the dome portion 360. A transformation of the dome portion 360 can be facilitated by the actuator 361. The dome portion 360 is configured to electrically-connect two contacts with each other when transformed, the two contacts formed at the FPCB 340 with a spacing distance therebetween.

The FPCB 340 is connected up to the printed circuit board mounted in the terminal body. Under such configuration, a signal generated when a user presses the key body 310 is transmitted up to the printed circuit board via the FPCB 340.

The light emitting portion 350 may be configured as a light emitting device such as an LED, and may be disposed on one surface of the FPCB 340. When the FPCB 340 is disposed to cross the hole 326, the light emitting portion 350 is disposed at one side of the light guiding portion 321. Under such configuration, light supplied from the light emitting portion 350 moves along the light guiding portion 321, thereby illuminating the key body 310.

As the light guiding portion 321 and the light emitting portion 350 are arranged in a state where the hole 326 is interposed therebetween, the signal input module 300 can have a reduced thickness.

Referring to FIG. 7 back, the supporting portion 295, configured to support the signal input module 300, may be formed in the case. The supporting portion 295 may be implemented as the case. For instance, the supporting portion 295 may be an intermediate case or a rear case. Alternatively, the supporting portion 295 may be implemented as a carrier serving as a dielectric substance of an antenna of the mobile terminal, or may be implemented as a socket serving as an interface. The supporting portion 295 may be an inner component of the mobile terminal having a predetermined strength.

The aforementioned actuator 361 may be disposed to come in contact with the supporting portion 295. Once a user presses the key body 310, the key base 320 and the FPCB 340 are pressed. At the same time, the actuator 361, disposed to come in contact with the supporting portion 295, presses a central part of the dome portion 360. Under such configuration, the pressed dome portion 360 is elastically-transformed by the actuator 361 to thus electrically-connect two contacts formed on a rear surface of the FPCB 340 with each other, thereby generating a signal.

Referring to FIGS. 7 and 9, the connection portion 324 or the fixing portion 323 may be provided with a separation member 325 configured to separate the FPCB 340 from the case.

A space may be formed between the FPCB 340 and the supporting portion 295 due to the separation member 325, and the dome portion 360 may be disposed in such space. The separation member 325 may be formed to have a prescribed strength.

Figure 11:
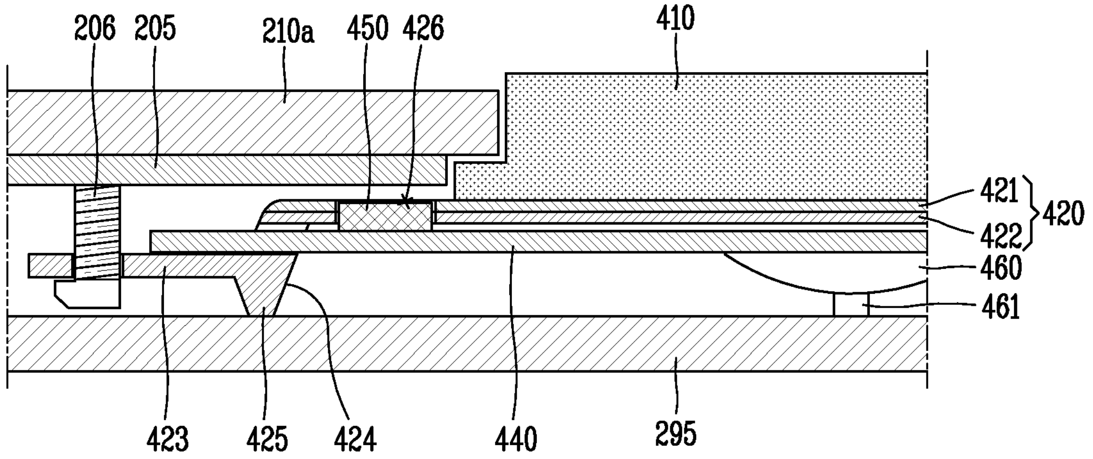
FIG. 11 is a sectional view of a signal input module according to another embodiment of the present invention.

FIG. 11 is a sectional view of a signal input module 400 according to another embodiment of the present invention.

As shown in FIG. 11, the signal input module 400 may include a key body 410, a key base 420 and a flexible printed circuit board (FPCB) 440.

The key body 410, the key base 420 and the FPCB 440 have the same configuration as those in the aforementioned embodiment. Hereinafter, only components differentiated from those of the aforementioned embodiment will be explained.

In the aforementioned embodiment, a light emitting portion 450 and a light guiding portion 421 are disposed in a state where a hole 426 formed at a connection portion 424 of the key base 420 is interposed therebetween. However, in this embodiment, an insertion portion 426 for inserting the light emitting portion 450 is formed at the key base 420. The insertion portion 426 may be implemented as a groove recessed toward inside of the key base 420, or a hole penetratingly-formed at the key base 420. Under such configuration, the light emitting portion 450 is positioned on a side surface of the light guiding portion 421, and the FPCB 440 may be coupled to the key base 420.

The present invention can have the following advantages.

Firstly, the key bodies 310 and 410, the key bases 320 and 420, and the FPCBs 340 and 440 are integrally formed with one another, thereby constituting the signal input modules 300 and 400. This can simplify assembly processes.

Secondly, as the key bases 320 and 420 are utilized as the light guiding portions 321 and 421, the number of components can be reduced and the signal input modules 300 and 400 can have a slim configuration.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:

a case having a through hole; and a signal input module coupled to the case such that part thereof is exposed to the outside via the through hole, wherein the signal input module includes:

a key body;

a key base coupled to a lower portion of the key body, and having fixing portions at both sides thereof, wherein each of the fixing portions is connected to the key base by corresponding connection portions, each including a hole, and wherein the connection portions extend between the key base and the corresponding fixing portions;

a flexible printed circuit board extending through the holes in the connection portions such that the flexible printed circuit board is located between the key base and the fixing portions, wherein the flexible printed circuit board comprises a dome portion on a lower surface thereof, the dome portion configured to generate a signal when pressed by the key base, and wherein a portion of an upper surface is covered by the key base; and a light emitting portion disposed on one surface of the flexible printed circuit board and disposed near by a hole of a corresponding connection portion, wherein the key base includes a light guiding layer and an elastic plate, and an edge of the light guiding layer is exposed by the hole of the corresponding connection portion and receives light from the light emitting portion; and wherein the flexible printed circuit board is disposed such that the fixing portions are arranged at a first height from a bottom of the signal input module, the key base is arranged at a second height from the bottom of the signal input module, and the flexible printed circuit board is formed at a third height from the bottom of the signal input module between the first height and the second height.

2. The mobile terminal of claim 1, further comprising a supporting portion formed in the case, and configured to support the signal input module, wherein the dome portion is disposed to contact the supporting portion.

3. The mobile terminal of claim 1, wherein the elastic plate formed such that a rear surface thereof contacts the flexible printed circuit board; and the light guiding portion is laminated on the elastic plate, and configured to receive light generated from the light emitting portion.

4. The mobile terminal of claim 1, wherein the connection portion or the fixing portion further includes a separation member configured to separate the flexible printed circuit board from the supporting portion.

5. The mobile terminal of claim 2, wherein an actuator protrudes from a central part of the dome portion, so as to contact the supporting portion.

6. The mobile terminal of claim 3, wherein the elastic plate and the light guiding portion are integrally formed with each other by double injection.

7. The mobile terminal of claim 3, wherein the light guiding portion further includes a printed layer formed such that light introduced from the light emitting portion has a specific color.

8. The mobile terminal of claim 3, wherein the light guiding portion is formed of at least one of PET (Polyethylene Terephthalate) and TPU (Thermo Plastic Polyurethane).

9. The mobile terminal of claim 3, wherein the elastic plate is formed of at least one of rubber, silicone, polyurethane, and thermoplastic polyurethane.

* * * * *